United States Patent
Evans et al.

(10) Patent No.: US 9,052,017 B2
(45) Date of Patent: Jun. 9, 2015

(54) FLEXIBLE FLOW CONTROL BUSHING

(75) Inventors: James R. Evans, Harmony, NC (US);
Ward A. Crosier, Statesville, NC (US)

(73) Assignee: SLADE, INC., Statesville, NC (US)

( * ) Notice: Subject to any disclaimer, the term of this patent is extended or adjusted under 35 U.S.C. 154(b) by 678 days.

(21) Appl. No.: 12/933,000

(22) Filed: Mar. 11, 2011

(65) Prior Publication Data

US 2012/0228832 A1    Sep. 13, 2012

(51) Int. Cl.
*F16J 15/18* (2006.01)
*F16J 15/20* (2006.01)

(52) U.S. Cl.
CPC ............... *F16J 15/18* (2013.01); *F16J 15/183* (2013.01); *F16J 15/20* (2013.01)

(58) Field of Classification Search
CPC .......... F16J 15/182; F16J 15/183; F16J 15/18
USPC .......................................... 277/512, 515, 516
See application file for complete search history.

(56) References Cited

U.S. PATENT DOCUMENTS

| | | | | | |
|---|---|---|---|---|---|
| 3,588,126 | A | * | 6/1971 | McKillop et al. | 277/511 |
| 3,752,490 | A | * | 8/1973 | Geffroy | 277/463 |
| 3,768,818 | A | * | 10/1973 | Minegishi | 267/1.5 |
| 4,498,681 | A | * | 2/1985 | Heinz | 277/516 |
| 5,013,053 | A | * | 5/1991 | Champlin | 277/516 |
| 5,022,660 | A | * | 6/1991 | Dunford et al. | 277/528 |
| 5,052,698 | A | * | 10/1991 | Kimura | 277/477 |
| 7,744,474 | B2 | * | 6/2010 | Valovick | 464/162 |
| D681,175 | S | * | 4/2013 | Evans et al. | D23/269 |
| 2007/0170657 | A1 | * | 7/2007 | Wilkinson | 277/585 |
| 2007/0170658 | A1 | * | 7/2007 | Wilkinson | 277/585 |

* cited by examiner

*Primary Examiner* — Kristina Fulton
*Assistant Examiner* — Nicholas L Foster
(74) *Attorney, Agent, or Firm* — Ralph H. Dougherty

(57) ABSTRACT

A flexible flow control bushing is comprised of flexible, high temperature resistant, self-lubricating composite material and has a unique configuration, which, viewed cross-sectionally, before installation has a squared off sine wave configuration with a uniform amplitude and gap. A fluid seal arrangement is also disclosed.

12 Claims, 5 Drawing Sheets

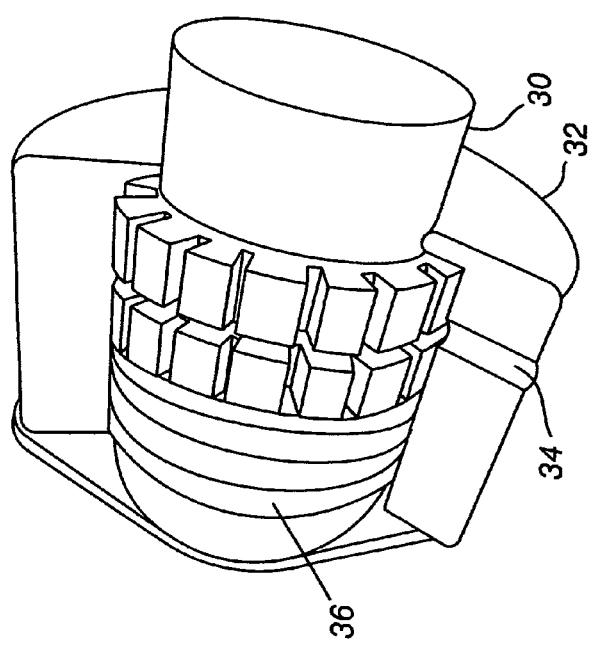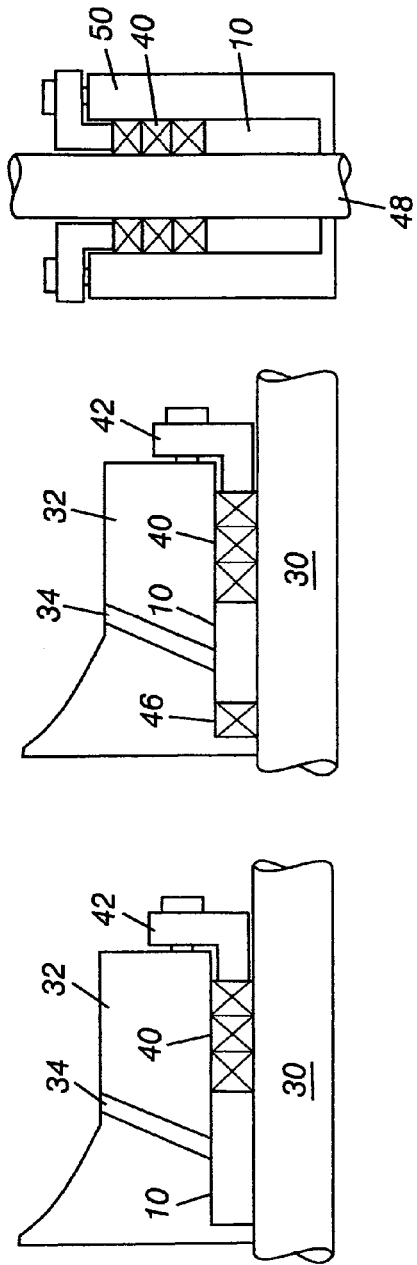

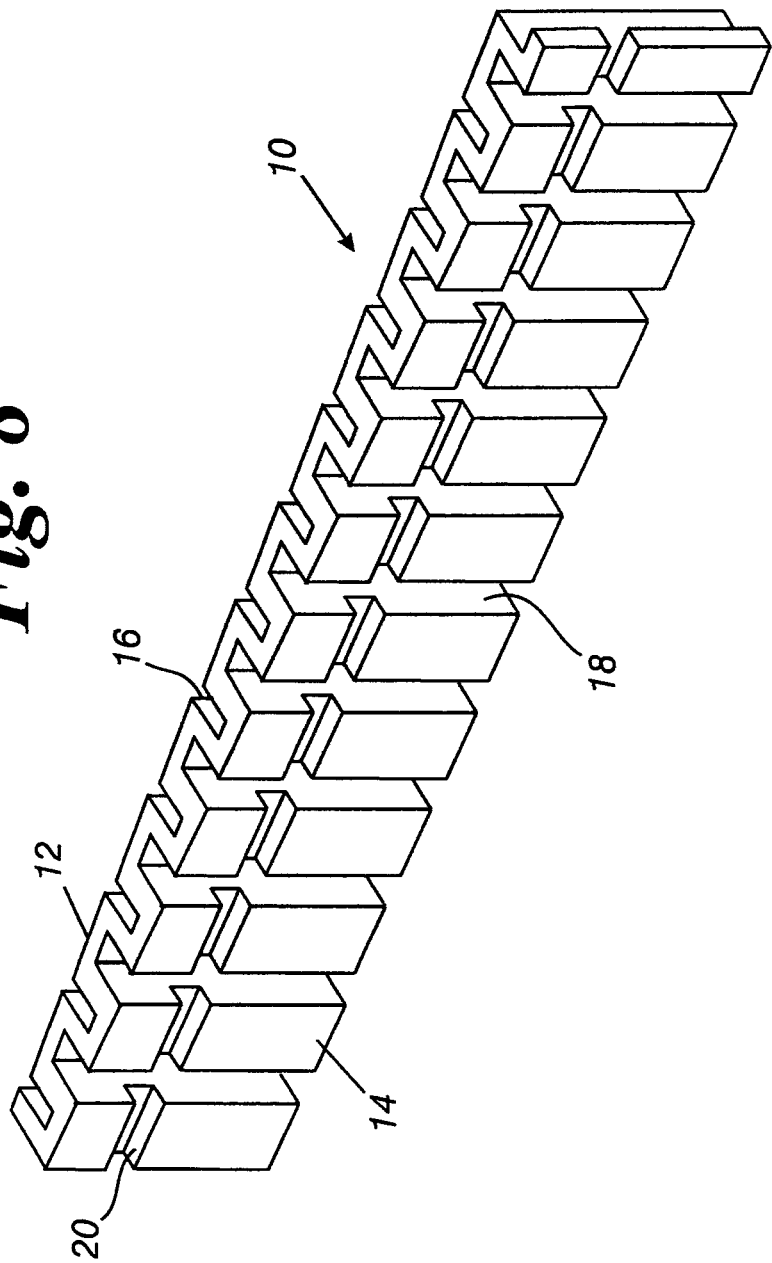

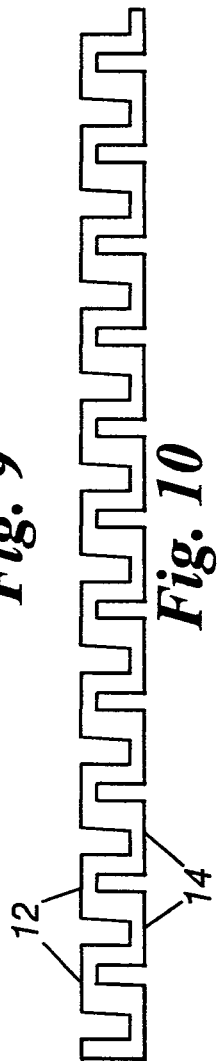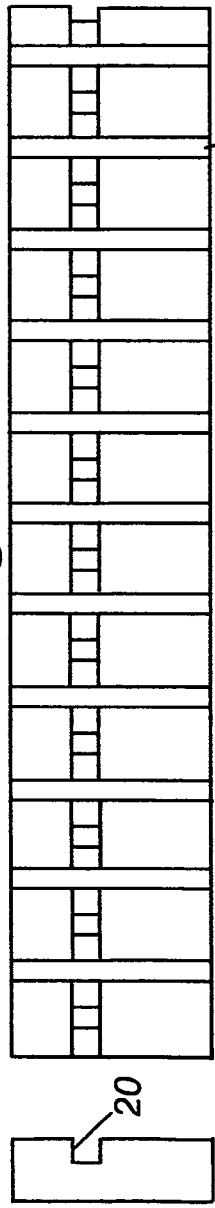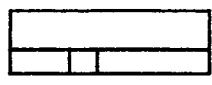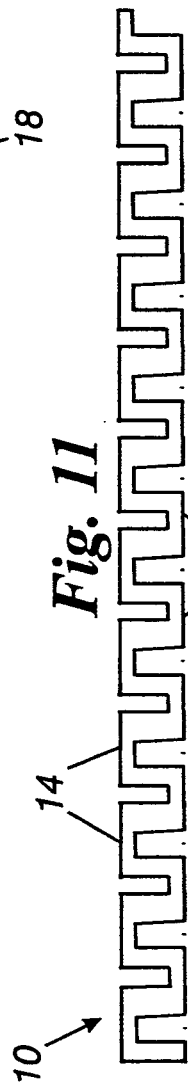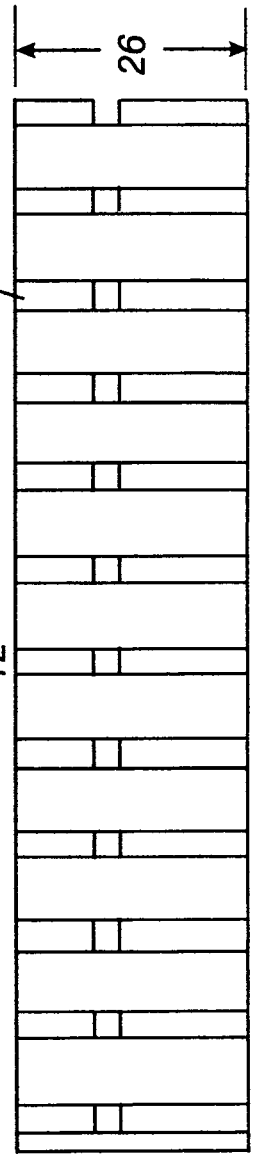

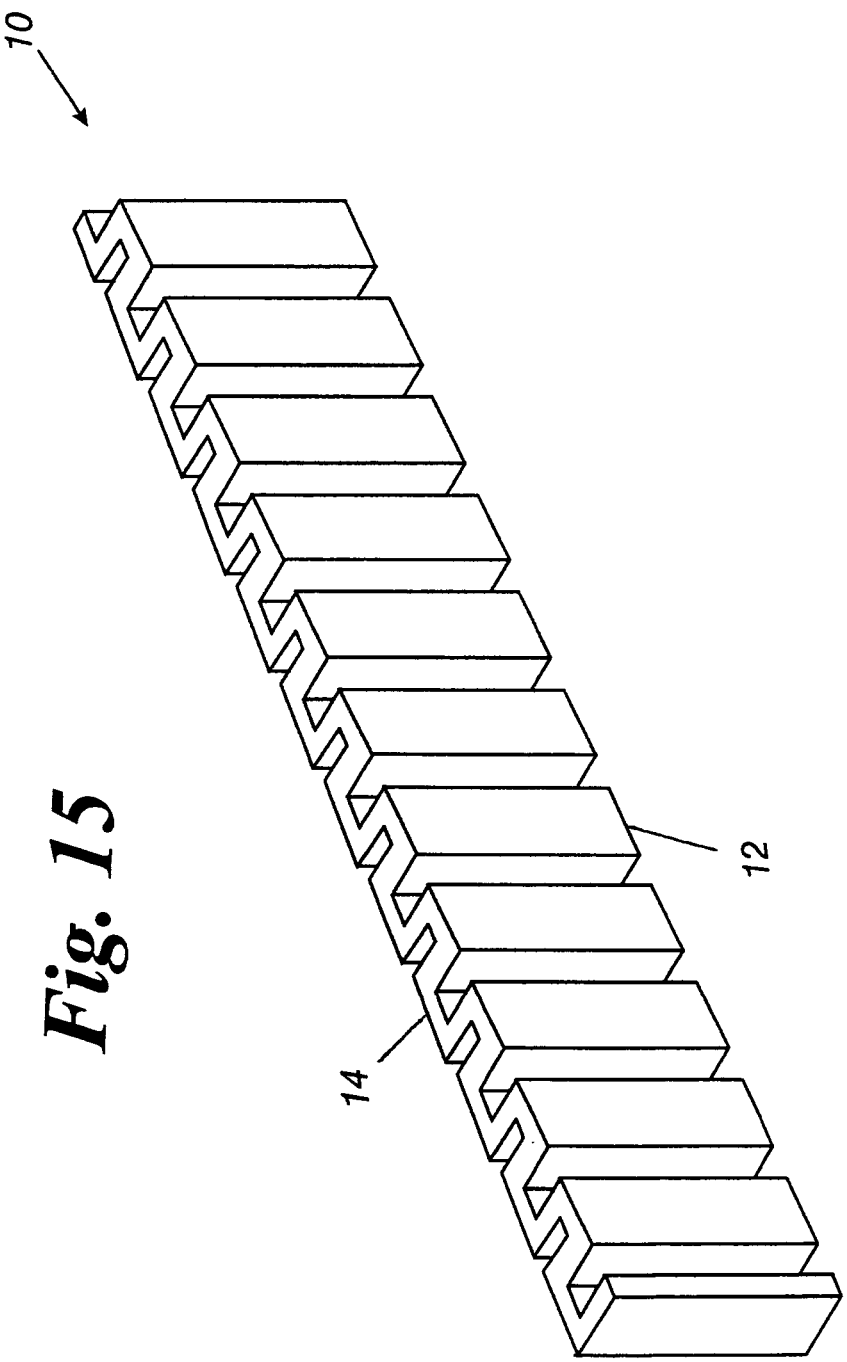

FLEXIBLE FLOW CONTROL BUSHING

FIELD OF THE INVENTION

The present invention relates to flexible flow control bushings, which work in conjunction with seals for valve stems and rotating and reciprocating shafts, and more particularly to a self-lubricating bushing having associated packing as a fluid seal that is adjustable and can be retro-fitted to many sealed assemblies, including bearing and stuffing box assemblies.

BACKGROUND OF THE INVENTION

In rotary pumps, fans, compressors, agitators, etc., the shaft projects through the casing in a zone known as the "stuffing box" or "packing box." These terms derive from the fact that in order to separate two environments, namely, the environment within the pump, fan, compressor, agitator, or the like, and the atmosphere, and to prevent leakage from one environment into the other, some material had to be stuffed or packed around the shaft where it passed through its casing. For many years soft packing was the material that was most often employed for this service.

In operation, rotating shafts may be displaced both radially and axially. Small inaccuracies resulting from machining, manufacturing, and assembly produce radial displacement, and differential thermal expansion causes axial displacement. Therefore the resulting seal must be flexible. Another characteristic of the seal is compactness, which is dictated by design limitations of the equipment. A common type of rotating shaft seal consists of packing composed of fibers which are first woven, twisted, or braided into strands, and then formed into coils, spirals, or rings. To ensure initial lubrication and to facilitate installation, the basic materials are often impregnated with a binder and a lubricant. Historically, commonly employed materials were asbestos fabric, rubber and duck, flax, jute, and metallic braids. In the manufacture of packings, the proper grade, and type of lubricant is selected for the packing. It is usually desirable to replenish the lubricant during the normal life of the packing; otherwise the packing becomes hard, and loses its resiliency. As the packing ages, friction increases producing heat, which can shorten the life of conventional packing and increase operating costs. An effective auxiliary device frequently used with packing is a lantern ring, sometimes called a seal cage. The lantern ring provides an annulus around the shaft for the introduction of lubricant. The lantern ring is also used to introduce liquid for cooling, and in some cases heating, to prevent the ingress of atmospheric air, and to prevent the infiltration of abrasives from the process liquid. The chief advantage of packing over other types of seals is the ease with which packing can be adjusted or replaced. The major disadvantages of a packing type seal are that it historically has a short life, adjustment must be frequent, and there is a need for some leakage to provide lubrication and cooling.

Mechanical seals have largely replaced packing seals on rotating shafts. Mechanical seals are reliable, have long life, and, in general, operate with no visible leakage. The term "mechanical seal" designates a prefabricated or packaged assembly that forms a running seal between the flat precision finished surfaces. The prior art teaches that all mechanical seals contain four common elements: a rotating seal ring, a stationary seal ring, a spring-loading section for maintaining seal-face contact, and static seals.

With the advent of centrifugal pumps, the pump shafts had been made solid and the type packing used at the time was made of an oil lubricated asbestos, which, after extended use, became very abrasive, causing wear damage to the shaft. The cost of replacing the entire solid shaft was very expensive and shaft sleeves were then introduced to reduce cost. The inexpensive shaft sleeve replacement cost only a fraction of the solid shaft replacement.

However, centrifugal pump shafts were made to operate at much higher speeds than the former rotary pump shafts which led to much greater shaft wear. Cost savings failed to improve because of the necessary frequency of replacement. Also the sleeve had a slight dead air space between it and the shaft interfering with or limiting heat transfer to the shaft.

Next, a water flush system was introduced to cool and lubricate the stuffing box surrounding the shaft. This introduced an additional new problem: the new sleeves were typically manufactured from stainless steel to provide service in corrosive environments. It should be noted that the stainless steel sleeve is protected by a naturally occurring phenomenon in which the stainless steel is passivated by the presence of chromium in the alloy. However, free oxygen present in flush water unites with the chromium in the stainless steel to form chromium oxide ($Cr_2O_3$) which is second only to diamond in hardness (Moh's Scale). Chromium oxide is used as a buffing medium to polish metals and is fused to form hard ceramic coatings. Chromium oxide is formed onto the shaft sleeve as the chromium migrates to the surface of the sleeve, resulting in the hard oxide coating which is wiped off and deposited onto the packing surface which polishes the sleeve surface destructively. This explains why, in simple water systems, the sleeve can be observed to take on a polished appearance and be badly worn when no abrasives are visibly present in the media. The worn portion of the sleeve then allows leakage into the environment causing housekeeping and pollution problems.

In the present invention, water is not allowed between the packing and the shaft to cause excessive wear. Water is simply introduced into the fluid media being pumped without the packing being turned into abrasive rings which would cause excessive wear.

What is needed is a self-lubricating bushing that also can serve as a lantern ring to control coolant flow. Furthermore, what is desired is a sealing apparatus that acts comparable to mechanical seals, which require much less maintenance than packing and generally can operate for longer periods between adjustments or replacement. Further, what is needed is a bushing that can accommodate minor wear and imperfections in a shaft. Highly desirous is a bushing or lantern ring that can be installed with a minimum amount of disassembly, and that can accommodate relatively high temperature and high revolutions.

SUMMARY OF THE INVENTION

The invention is a flexible flow control bushing that is comprised of high temperature resistant, self-lubricating composite material, preferably including a substantial percentage of fluorocarbon, most preferably polytetrafluoroethylene (PTFE), and which has a unique configuration. Viewed cross-sectionally, before it is installed, the bushing appears to have a squared off sine wave configuration with a uniform amplitude and gap.

There is no necessity for metal core reinforced graphite foils to provide structural reinforcement along with lubricity. The structural reinforcement and integrity is provided by the flexible bushing itself.

The instant invention is a flexible bushing that has unique properties, and when installed with proper packing, produces an extremely effective seal. The bushing aids the packing in making a fluid seal that is adjustable and can be retrofitted to many sealed assemblies. The invention can also be characterized as a flexible lantern ring, which installed with proper packing produces an extremely effective seal, and which provides effective flow control. The flexible flow-control bushing, when containing PTFE, can withstand operating temperatures to 500° F. (260° C.), and it has excellent corrosion resistance. The bushing is easy to install, and can be easily adjusted, if necessary, to maintain its compression against the packing within a stuffing box. The invention is useful in sealed assemblies such as bearing, stuffing box, packing, or bushing assemblies.

OBJECTS OF THE INVENTION

It is the principal object of the invention to provide a flexible bushing that can be manufactured in an elongated strip that can be easily cut by an operator in the field to fit about any size shaft, and in any stuffing box.

It is another object of this invention to provide a flexible bushing that can act in concert with packing rings to provide a fluid seal.

It is another object of the invention to provide a flexible bushing that will allow a reduction of the number of packing rings required to provide an effective fluid seal.

It is also an object of the invention to provide a bushing for a fluid seal that requires less installation time than prior seals utilizing solely packing or packing rings.

It is also an object of the invention to provide a fluid seal that creates a reduced amount of friction, heat and amperage draw than existing seals.

It is another object of the invention to provide a flexible bushing that will assist in maintaining proper compression of the packing rings by reducing the total number of packing rings and the surface area needing to be compressed.

It is another object of this invention to provide a flexible bushing that is self-lubricating.

It is also an object of the invention to provide a sealing apparatus that acts comparable to mechanical seals, which require much less maintenance than packing alone, and generally can operate for longer periods between adjustments or replacement.

It is a further object of the invention to provide a flexible bushing that can accommodate minor wear and imperfections in a shaft.

It is another object of the invention to provide a flexible bushing that can be installed with a minimum amount of disassembly during installation.

It is another object of the invention to provide a flexible bushing for a shaft that can accommodate relatively high temperature and high revolutions.

It is also an object of the invention to provide a flexible flow control bushing that can act as a lantern ring.

It is another object of the invention to provide a sealing assembly that requires fewer sealing rings than in prior assemblies, resulting in reducing the required maintenance time for replacing the sealing rings.

BRIEF DESCRIPTION OF THE DRAWINGS

The foregoing and other objects will become more readily apparent by referring to the following detailed description and the appended drawings in which:

FIG. 4 is a partial cross-sectional view of a bearing housing and shaft with the invented flexible flow control bushing installed about a shaft.

FIG. 5 is a schematic partial cross-sectional view of the invented flexible flow control bushing installed about a shaft in a typical shiny pump arrangement.

FIG. 6 is a schematic partial cross-sectional view of the invented flexible flow control bushing installed about a shaft in alternative slurry pump arrangement.

FIG. 7 is a schematic partial cross-sectional view of the invented flexible flow control bushing installed about a shaft or stem in a valve arrangement.

FIG. 8 is a perspective view of the invented flexible flow control bushing prior to being bent or curved for installation.

FIG. 9 is a top view of the invented flexible flow control bushing of FIG. 8

FIG. 10 is a front view of the invented flexible flow control bushing.

FIG. 11 is a bottom view of the invented flexible flow control bushing

FIG. 12 is a rear view of the invented flexible flow control bushing.

FIG. 13 is a left end view of the invented flexible flow control bushing.

FIG. 14 is a right end view of the invented flexible flow control bushing.

FIG. 15 is a perspective view of an alternative style of the invented flexible flow control bushing prior to being bent or curved for installation.

DETAILED DESCRIPTION

Figure 1:
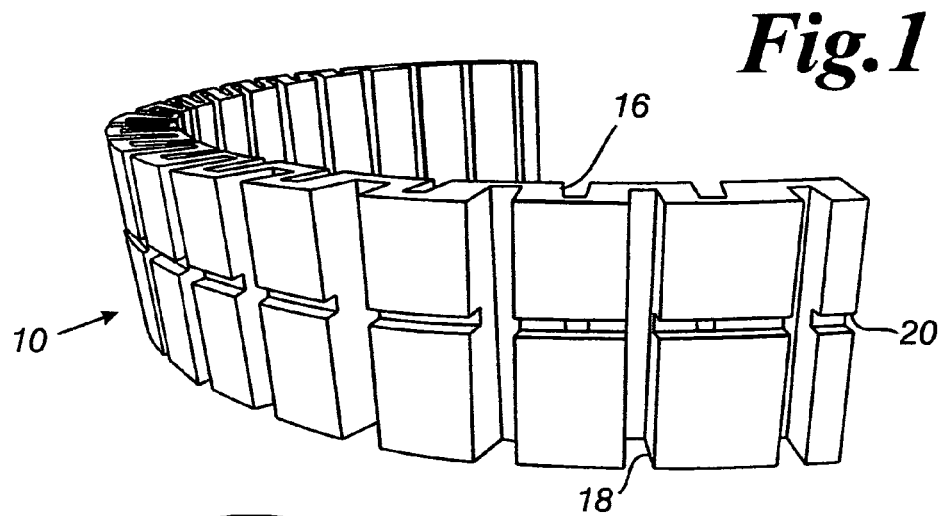
FIG. 1 is a perspective view of the invented flexible flow control bushing prior to installation.

Referring now to the drawings, FIGS. 1 and 15 show a flow control bushing 10 comprised of a machined, tooled or worked composite material formed into a squared-off sine wave configuration as shown in FIGS. 8 and 9, having upper nodes 12 and lower nodes 14 formed by what shall be referred to as inner lateral cuts 16 and outer lateral cuts 18 which aid in flexibility and versatility of the bushing. The bushing is made of a flexible, high temperature resistant, self-lubricating composite base material, which preferably contains from about 30% fluorocarbon to as much as 80% fluorocarbon, with the balance being a filler material consisting of carbon, graphite, fiberglass, glass, or a mixture thereof. The broad range is about 10-30% graphite, about 10 to about 50% carbon, and about 30 to about 80% polytetrafluoroethylene (PTFE). The preferred range is about 40 to 45% PTFE, with the balance being about 10 to about 20% graphite, and about 40 to about 45% carbon. All percentages are by weight. These are referred to as carbon-filled PTFE, glass-filled PTFE, carbon-filled PTFE, or graphite-filled PTFE.

Figure 2:
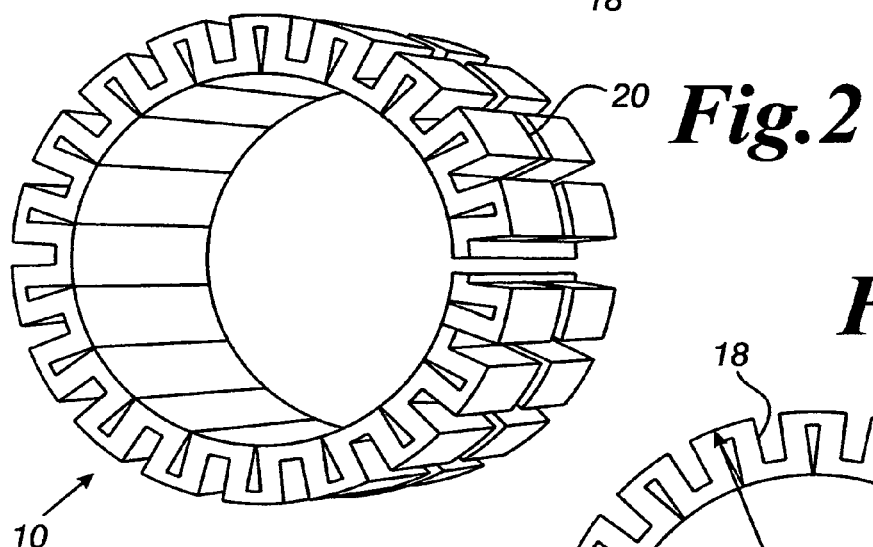
FIG. 2 is a perspective view of the invented flexible flow control bushing ready for installation about a shaft.
Figure 3:
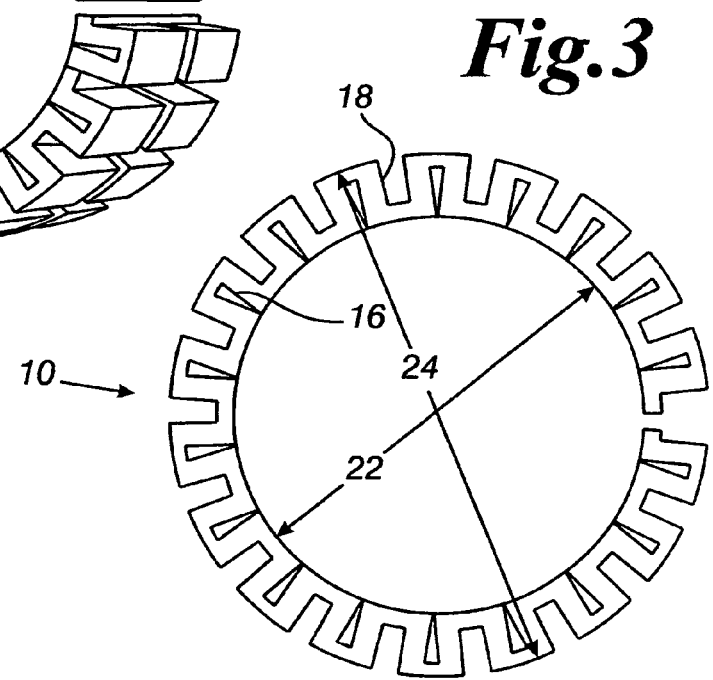
FIG. 3 is an end view of the flow control bushing of FIG. 2.

As shown in FIG. 1, horizontal cut or groove 20 can be added to one face of the bushing for the purpose of transferring of cooling fluid from one side of the bushing to the opposite side. Such cooling fluid is usually water. As the bushing is flexed, as shown in FIGS. 1 and 2, the outer lateral cuts 18 expand, while the interior lateral cuts 16 constrict, as best shown in FIG. 3, reducing the flow from exterior to interior of the bushing. It can be used not only to introduce water into the stuffing box, but it also can be used in what is referred to as an "in and out flush" or "flush and drain". In this procedure, fluid is introduced through an orifice at one side of the stuffing box, passes through the bushing and exits the stuffing box from the opposite side from a smaller diameter orifice than that on the introduction side. Note that in a non-abrasive media, the seal can be operated without flushing.

The bushing is manufactured in an elongated strip that can be easily cut, either in the shop or in the field, to fit about any size shaft, and in any stuffing box. The bushing can be used for a variety of purposes with minimal changes to the size, shape, and design of it. The bushing is dimensioned to fit within stuffing box dimensions. This includes: shaft, sleeve, or stem outer diameter, which are the same as the inner diameter (ID) 22 of bushing 10 when installed (see FIG. 3); stuffing box bore, which is the same as the outer diameter (OD) 24 of bushing 10 when installed; and the desired depth 26 (see FIG. 12) of bushing 10. Use of the bushing 10 will reduce the otherwise required number of packing rings, which aids in shaft stabilization, reduces the amount of media required to be introduced to the stuffing box, and controls fluid flow.

The cuts 16 and/or 18 can be straight, or they can be angled to form a wedge-like space or gap, as desired. The horizontal cut or groove 20 is generally centered on the face of the bushing, as shown in FIG. 1, or the groove 20 may be off-center, as shown in FIGS. 8 and 10.

As shown in partially cutaway FIG. 4, the invented bushing 10 is installed about shaft 30, in a shaft housing 32 which has a fluid injection port 34. The seal is created by the bushing 10 and graphite packing rings 36 which bear against the bushing. The bushing and the packing rings act in concert to provide an effective fluid seal.

In the slurry pump arrangement of FIG. 5, a reinforced graphite packing 40 is installed to thrust against the bushing 10, which thrust is created and maintained by retainer 42 fixed to housing 32, as shown. Retainer 42 is sometimes referred to in the industry as a "packing follower" or "packing gland follower".

In the alternative slurry pump arrangement of FIG. 6, a carbon jacketed fiber packing 46 is installed at one side of the bushing 10, with reinforced graphite packing 40 installed at the other side. The bushing 10 and packing 40 and 46 are retained in position by retainer 42, which is fixed to housing 32.

In a standard valve arrangement, as shown in FIG. 7, the invented bushing is installed about valve stem 48 in a stuffing box 50 with reinforced graphite packing 40, and retained in position in the same manner as in FIG. 5.

Installation of the invented bushing allows reduction of the number of packing rings required to provide an effective fluid seal. Because the bushing does not have a fixed diameter, but is formed around the shaft or stem, a seal utilizing the bushing requires less installation time than prior seals utilizing solely packing or packing rings. The seal requires only a minimum amount of machine disassembly during installation, The bushing can be retro-fitted to many bearing assemblies merely by removing a portion of the packing and replacing it with a properly sized bushing.

The composite material of the bushing is smooth, with a very low friction coefficient, and since the bushing forms a substantial part of the seal, in operation the fluid seal creates a much reduced amount of friction, less heat, and requires a reduced amperage draw over prior seals. Because there is only a limited amount of friction, there is reduced wear of the shaft. The bushing can readily accommodate minor wear and imperfections in the shaft or stem. A substantial portion of the composite base material of the bushing is hydrophobic fluorocarbon, (preferably polytetrafluoroethylene), and alternatively can be nylon, phenolic resin, or polyether ether ketone (PEEK).

The invented bushing 10 assists in maintaining proper compression of the packing rings by reducing the number of packing rings needing to be compressed. Because of its material composition, the bushing is self-lubricating.

The bushing will accommodate a high rate of shaft RPM and can withstand operating temperatures created by the shaft rotation up to about 500° F. (260° C.).

In operation on a shaft, the seal transmits heat away from the shaft, forcing circulation of cooling media into the cooler regions of the stuffing box, increasing dwell time and thus lowering the overall operating temperature as well as reducing friction and wear.

SUMMARY OF THE ACHIEVEMENT OF THE OBJECTS OF THE INVENTION

From the foregoing, it is readily apparent that we have invented a flexible flow control bushing that can act in concert with packing rings to provide a fluid seal, that is self-lubricating, that acts comparable to mechanical seals, which allows a reduction in the number of packing rings required, creates a reduced amount of friction, heat and amperage draw, and generally can operate for longer periods of time between adjustments or replacement. The invented bushing is manufactured in an elongated strip that can be easily cut to fit about any size shaft or stem, and in any stuffing box. The invented bushing can also accommodate minor wear and imperfections in a shaft, can be installed in a relatively short time with a minimum amount of disassembly during installation, and can accommodate relatively high temperature and high revolutions.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. A flexible flow control bushing, comprising a flexible, high temperature resistant, self-lubricating composite material, having a configuration in the elongated position prior to installation, of a squared-off sine wave cross section with equally, spaced nodes forming opposed recesses in the bushing on the opposed faces thereof, and, when the cross-section is laid flat, is defined by a top periphery and, a bottom periphery, the top periphery and the bottom periphery both being shaped like square waves having alternating nodes and recesses when viewed from the side, and that the square waves are offset so that the nodes of one wave overlap the recesses of the other and vice versa, the entire cross-section when viewed from the side approximating a square wave so that nodes of the square wave of one periphery fully overlap recesses of the square wave of the other periphery and vice versa, one side of the bushing being provided with a generally central elongated groove which extends through the top periphery and partially into the opposing, recess.

2. A flexible flow control bushing according to claim 1, wherein the composite material will withstand temperatures up to 260° C.

3. A flexible flow control bushing according to claim 1, wherein the composite material contains from about 3.0% to about 80% fluorocarbon, with the balance being carbon, graphite, or a Mixture thereof.

4. A flexible flow control bushing according to claim 3, wherein die composite material contains from about 30 to about 80% polytetrafluoroethylene, about 10-30% graphite, and about 10 to about 50% carbon.

5. A flexible flow control bushing according to claim 3, wherein the composite material contains from about 40% to about 45% polytetrafluoroethylene, about 10 to about 20% graphite, and about 40-45% carbon.

6. A flexible flow control bushing according to claim 1, wherein the composite comprises a base material selected from the group consisting of hydrophobic fluorocarbon, polytetrafluoroethylene, polyether ether ketone, nylon, and phenolic resin, and a filler selected from the group consisting of carbon, graphite, fiberglass, glass, or a mixture thereof.

7. A fluid seal for a rotatable shaft, comprising:
at least one graphite packing ring having an inner diameter approximately the diameter of said shaft;
a flexible flow control bushing comprising a flexible, high temperature resistant, self-lubricating composite base material, having a configuration in the elongated position prior to installation, of a squared-off sine wave cross section with equally spaced nodes forming opposed recesses in the bushing on the opposed faces thereof, and, when the cross-section is laid flat, is defined by a top periphery and a bottom periphery, the top periphery and the bottom periphery both being shaped like square waves having alternating nodes and recessed when viewed from the side, and that the square waves are offset so that the nodes of one wave overlap the recesses of the other and vice versa, the top periphery of the bushing being provided with a generally central elongated groove which extends through the top periphery and partially into the opposing recess; and
a retaining element for thrusting and retaining said packing ring against said bushing the entire cross-section when viewed from the side approximates a square wave and that nodes of the square wave of one periphery fully overlap recesses of the square wave of the other periphery and vice versa.

8. A fluid seal for a rotatable shaft according to claim 7, wherein the composite base material of the bushing contains from about 30% to about 80% fluorocarbon, with the balance being a filler material of carbon, graphite, or a mixture thereof.

9. A fluid seal for a rotatable shaft according to claim 8, wherein the composite base material of the bushing contains from about 30 to about 80% polytetrafluoroethylene, with the filler being about 10-30% graphite, and about 10 to about 50% carbon.

10. A fluid seal for a rotatable shaft according to claim 7, wherein the composite base material of the bushing contains from about 40% to about 45% polytetrafluoroethylene, with the the filler material being about 10 to about 20% graphite, and about 40 to about 45% carbon.

11. A fluid seal for a rotatable shaft according to claim 7, wherein the composite base material of the bushing is selected from the group consisting of hydrophobic fluorocarbon, polytetrafluoroethylene, polyether ether ketone, nylon, and phenolic resin, and includes a filler selected from the group consisting of carbon, graphite, fiberglass, glass, or a mixture thereof.

12. A fluid seal for a rotatable shaft according to claim 7, wherein said bushing is installed about a shaft in a shaft housing, and said retaining element is fixed to said housing.

\* \* \* \* \*